(12) United States Patent
Strauss

(10) Patent No.: US 10,933,536 B2
(45) Date of Patent: Mar. 2, 2021

(54) SPRUNG WORM GRIPPER FOR A ROBOTIC DEVICE

(71) Applicant: X Development LLC, Mountain View, CA (US)

(72) Inventor: Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 375 days.

(21) Appl. No.: 16/005,736

(22) Filed: Jun. 12, 2018

(65) Prior Publication Data

US 2018/0290310 A1      Oct. 11, 2018

Related U.S. Application Data

(63) Continuation of application No. 15/146,692, filed on May 4, 2016, now Pat. No. 10,016,901.

(51) Int. Cl.
*B25J 15/02* (2006.01)
*B25J 15/00* (2006.01)
*B25J 13/08* (2006.01)

(52) U.S. Cl.
CPC ......... *B25J 15/0213* (2013.01); *B25J 13/085* (2013.01); *B25J 15/0009* (2013.01); *B25J 15/0028* (2013.01)

(58) Field of Classification Search
CPC .. B25J 15/0213; B25J 15/0028; B25J 15/026; B25J 9/102; B25J 9/126; B25J 13/085; B25J 15/0009

See application file for complete search history.

(56) References Cited

U.S. PATENT DOCUMENTS 3,202,449 A    8/1965  Lemelson
4,600,357 A    7/1986  Coules
(Continued)

FOREIGN PATENT DOCUMENTS

JP    S61120492 U    7/1986
JP    3156145 U     12/2009
(Continued)

OTHER PUBLICATIONS

International Searching Authority, International Search Report and Written Opinion dated Sep. 19, 2017, Issued in connection with International Patent Application PCT/US2017/029832, filed on Apr. 27, 2017, 11 Pages.

*Primary Examiner* — Dean J Kramer
(74) *Attorney, Agent, or Firm* — McDonnell Boehnen Hulbert & Berghoff LLP

(57) ABSTRACT

A robotic gripping device is provided. The device includes a finger having a worm gear coupled to its base end. The device also includes an actuator having a motor and a shaft, wherein the shaft is configured to rotate a worm coupled to the worm gear, and the actuator is mounted on a carriage such that the actuator is configured to slide along an axis. The device also includes a spring having first and second ends, wherein the first end is coupled to the motor and the second end is fixed. Further, the actuator is configured to (i) rotate the shaft relative to the motor by a first amount to move the finger toward an object, and (ii) when the finger is in contact with the object and is prevented from further movement, further rotate the shaft relative to the motor to slide the actuator along the axis.

20 Claims, 9 Drawing Sheets

(56) References Cited

U.S. PATENT DOCUMENTS

| | | | |
|---|---|---|---|
| 4,957,320 | A | 9/1990 | Ulrich |
| 5,054,836 | A | 10/1991 | Shulz |
| 5,501,498 | A | 3/1996 | Ulrich |
| 7,168,748 | B2 | 1/2007 | Townsend et al. |
| 8,141,925 | B2 | 3/2012 | Mizuno et al. |
| 8,534,729 | B2 | 9/2013 | Wilkinson et al. |
| 8,936,289 | B1 | 1/2015 | Kozlowski et al. |
| 9,718,195 | B1 | 8/2017 | Youmans |
| 10,016,901 | B2 * | 7/2018 | Strauss ................ B25J 15/0028 |
| 2003/0090115 | A1 | 5/2003 | Kim et al. |
| 2005/0040663 | A1 | 2/2005 | Kameda et al. |
| 2010/0005918 | A1 | 1/2010 | Mizuno et al. |
| 2010/0095799 | A1 | 4/2010 | Albin et al. |
| 2012/0215358 | A1 | 8/2012 | Gettings et al. |
| 2013/0057004 | A1 | 3/2013 | Murata et al. |
| 2013/0090761 | A1 | 4/2013 | Sejimo et al. |
| 2014/0021731 | A1 | 1/2014 | Gao et al. |
| 2014/0117686 | A1 | 5/2014 | Akae |
| 2015/0151433 | A1 | 6/2015 | Rust et al. |
| 2015/0190931 | A1 | 7/2015 | Claffee et al. |

FOREIGN PATENT DOCUMENTS

| | | |
|---|---|---|
| JP | 2011245568 A | 8/2011 |
| WO | 2008/069306 | 6/2008 |

\* cited by examiner

SPRUNG WORM GRIPPER FOR A ROBOTIC DEVICE

CROSS-REFERENCE TO RELATED APPLICATIONS

The present application is a continuation of and claims priority to U.S. patent application Ser. No. 15/146,692 filed on May 4, 2016 and entitled "Sprung Worm Gripper for a Robotic Device" which is herein incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

The present application discloses implementations that relate to determining an amount of torque applied to a finger of a robotic gripping device. When a robotic gripping device grasps an object, a finger of the robotic gripping device may apply pressure to the object, which in turn may apply a responsive force or torque on the finger. It may be beneficial for a user, operator, or control system to know and/or control how much torque or force is being applied to the finger and/or object.

In one example, the present application describes a robotic gripping device. The robotic gripping device includes a finger having a worm gear coupled to a base end of the finger. The robotic gripping device also includes an actuator having a motor and a shaft, wherein the shaft is configured to rotate a worm coupled to the worm gear, and wherein the actuator is mounted on a carriage such that the actuator is configured to slide along an axis. The robotic gripping device yet further includes a spring having a first end and a second end, wherein the first end is coupled to the motor of the actuator and the second end is fixed, such that the actuator is held in a first position along the axis when the spring is at equilibrium. The actuator of the gripping device is configured to rotate the shaft relative to the motor by a first amount, thereby rotating the worm and the worm gear to move the finger toward an object. The actuator is further configured to, when the finger is in contact with the object and the finger is prevented from further movement, further rotate the shaft relative to the motor to slide the actuator along the axis to a second position at which the spring is no longer at equilibrium.

In another example, a robotic device is described. The robotic device includes a robotic gripping device and a control system. The robotic gripping device includes a finger having a worm gear coupled to a base end of the finger. The robotic gripping device also include an actuator having a motor and a shaft, wherein the shaft is configured to rotate a worm coupled to the worm gear, and wherein the actuator is mounted on a carriage such that the actuator is configured to slide along an axis. The robotic gripping device also includes a spring having a first end and a second end, wherein the first end is coupled to the motor of the actuator and the second end is fixed, such that the actuator is held in a first position along the axis when the spring is at equilibrium. The control system is configured to control the robotic gripping device. The control system includes one or more processors. The control system also includes a non-transitory computer-readable memory. The control system further includes program instructions stored on the non-transitory computer-readable memory and executable by the one or more processors to carry out a set of acts. The set of acts includes causing the actuator to rotate the shaft relative to the motor by a first amount, thereby rotating the worm and the worm gear to move the finger toward an object. The set of acts further includes, when the finger is in contact with the object and the finger is prevented from further movement, causing the actuator to further rotate the shaft relative to the motor to slide the actuator along the axis to a second position at which the spring is no longer at equilibrium.

In a third example, a method is described. The method involves identifying an object for a robotic gripping device to grasp, wherein the robotic gripping device comprises a finger, an actuator, and a spring. The finger has a worm gear coupled to a base end of the finger. The actuator has a motor and a shaft, wherein the shaft rotates a worm coupled to the worm gear, and wherein the actuator is mounted on a carriage such that the actuator can slide along an axis. The spring has a first end and a second end, where the first end is coupled to the motor of the actuator and the second end is fixed, such that the actuator is held in a first position along the axis when the spring is at equilibrium. The method may also involve rotating the shaft relative to the motor by a first amount, thereby rotating the worm and the worm gear to move the finger toward an object. The method may still further include, when the finger is in contact with the object and the finger is prevented from further movement, further rotating the shaft relative to the motor to slide the actuator along the axis to a second position at which the spring is no longer at equilibrium.

In another example, a control system is described. The control system includes means for identifying an object for a robotic gripping device to grasp, wherein the robotic gripping device comprises a finger, an actuator, and a spring. The finger has a worm gear coupled to a base end of the finger. The actuator has a motor and a shaft, wherein the shaft rotates a worm coupled to the worm gear, and wherein the actuator is mounted on a carriage such that the actuator can slide along an axis. The spring has a first end and a second end, where the first end is coupled to the motor of the actuator and the second end is fixed, such that the actuator is held in a first position along the axis when the spring is at equilibrium. The control system also includes means for rotating the shaft relative to the motor by a first amount, thereby rotating the worm and the worm gear to move the finger toward an object. The control system also includes means for, when the finger is in contact with the object and the finger is prevented from further movement, further rotating the shaft relative to the motor to slide the actuator along the axis to a second position at which the spring is no longer at equilibrium.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
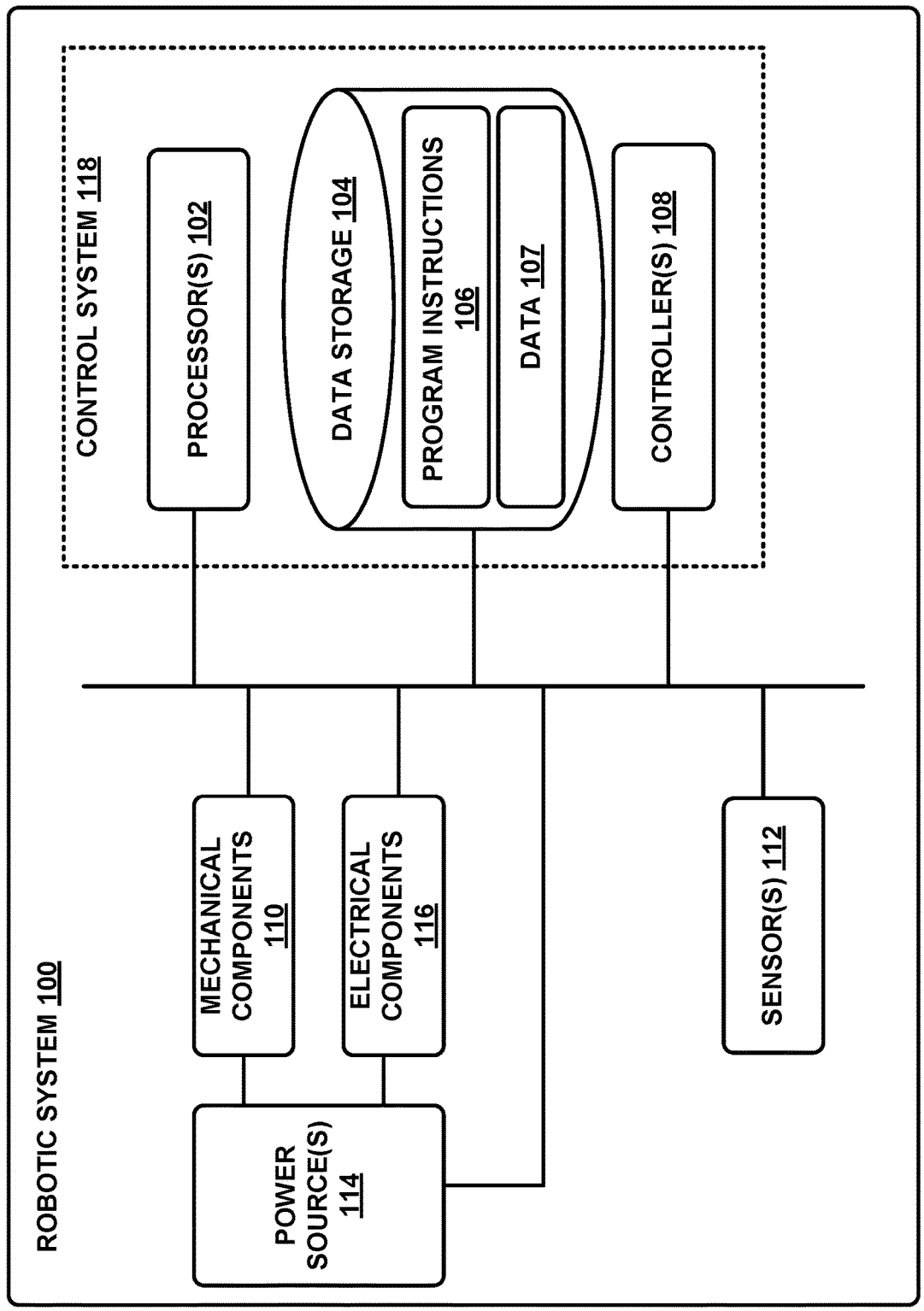
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

Robotic end effectors may be used in many situations to allow a robotic device to interact with an environment by pushing, pulling, grasping, holding, or otherwise interacting with one or more objects in the environment. For instance, a robotic device may include a robotic gripper having one or more fingers that can be actuated to change their shape, thereby allowing the robotic gripper to interact with the environment.

In the field of robotics, and robotic grippers in particular, the control system of a robotic device may operate more effectively when provided with information regarding the position, orientation, and forces acting on each component of the robotic device. To provide this information, different types of sensors may be placed on or included in one or more components. However, increasing the number of sensors also means increasing the complexity of the system, as well as increasing the number of possible points of failure.

With these concepts in mind, an example robotic gripping device disclosed herein may include a robotic finger that can be controlled by an actuator mounted on a moveable carriage, with a spring connecting the actuator to a base section. The finger may rotate about an axis, and may have a worm gear on a base end of the finger. The actuator can have a worm reduction stage (i.e., a worm screw or worm shaft) coupled to the worm gear on the base end of the finger. As such, the actuator can rotate a shaft along a first axis to cause the finger to rotate along a perpendicular axis. And when a torque acts upon the finger, the force may cause the actuator and/or carriage to slide along the axis, thereby compressing or expanding the spring. The compression and/or expansion of the spring may allow a control system to determine the amount of torque acting on the finger.

Example embodiments of a robotic gripping device disclosed herein may include a finger having a worm gear coupled to a base end of the finger. The shape of the worm gear may be a full circle, or may have another shape. Further, the finger may be an underactuated finger.

The robotic gripping device may also include an actuator having a motor and a shaft. The actuator may be mounted on a carriage, and the carriage may be configured to slide along an axis. Further, the shaft of the actuator may be coupled to or include a worm, wherein the worm is coupled to the worm gear of the finger. Rotation of the shaft may thus cause the worm to rotate and drive the worm gear of the finger.

The robotic gripping device may also include one or more springs. The spring may be positioned such that one end is coupled to the actuator and/or carriage and the other end is fixed, such as to the base of the robotic gripping device. This arrangement may allow the spring to compress or expand in response to movement of the actuator. Further, the spring may hold the actuator in a generally stable position when the spring is in equilibrium. As such any force acting on the actuator to move it along the axis may cause the spring to compress or expand, and responsively impart a force on the actuator to return the actuator to an equilibrium position.

In some examples, the actuator may be configured to rotate the shaft relative to the motor (i.e., engage, turn on, or actuate the actuator). Rotation of the shaft may in turn cause the worm to rotate, which in turn may cause the worm gear to rotate and the finger to move. The actuator may be in a first position, and may remain in the first position while the finger is moving before the finger makes contact when the object. The finger may continue to move until it contacts an object, and faces a reaction force from the object. At this point, the actuator may continue to rotate the shaft relative to the motor, but instead of causing the finger to rotate further, the additional rotation of the shaft may cause the actuator to slide along the axis, thereby compressing or expanding the spring. At this point, the actuator is at a second position in which the spring is no longer at equilibrium. The spring may impart a force on the actuator in the opposite direction, which may pass through the shaft, worm, and worm gear to the finger, in an attempt to further rotate the finger.

In some examples, an encoder may be used to detect the rotation of the shaft relative to the motor and/or another component of the robotic gripping device. In still other examples, the robotic gripping device may include a linear encoder such as a slide potentiometer configured to detect the position of the actuator on the axis along which it slides. The robotic gripping device may also include or be controlled by a control system, which may determine an amount of torque acting on the finger based on the encoder, potentiometer, and/or one or more characteristics of the spring.

Still further, in some examples the worm gear coupled to the finger may be shaped in a partial circle. As such, rotation of the worm gear past a threshold may cause the worm gear to disengage from the worm because the teeth of the worm gear and the worm no longer mesh. This threshold of rotation may correspond to a threshold torque acting on the finger that causes the worm gear to rotate. A benefit of the worm gear disengaging from the worm is that damage to the components of a robotic gripping device may be prevented. In real world applications, objects or loads may act on the gripping device in an unintended manner. For instance, a robotic device may fall over and land on an appendage that includes a robotic gripping device. In that instance a large unintended load may act on the finger, causing the finger to be driven backward. However, because the worm is not back-drivable, drivetrain damage may occur if the gear teeth cannot disengage to move out of the way. But where the worm gear is a partial circle and the finger is quasi-back-drivable, when the finger moves past a threshold (i.e., a threshold torque acts on the finger) the worm gear may disengage and prevent damage.

In some examples, an example robotic gripping device disclosed herein may maintain a constant torque when the motor is turned off or unpowered. The motor may be configured such that when it is powered, it rotates the shaft, which in turn rotates the worm, the worm gear, and moves the finger. There may also be a high reduction ratio between the worm and the worm gear, such that a relatively large number of full rotations of the worm is required to rotate the worm gear by a full rotation. This high reduction ratio may allow the worm to drive the worm gear, but may prevent the worm gear from driving the worm. As such, the finger may maintain its current position when power to the motor is turned off. Still further, when the spring has been compressed and the power to the motor is turned off, the torque acting on the finger at that moment may be maintained. The combination of the force of the compressed spring and the non-back-drivable quality of the worm gear and worm may cause the robotic gripping device to maintain the current torque acting on the finger. Other variations are possible as well.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
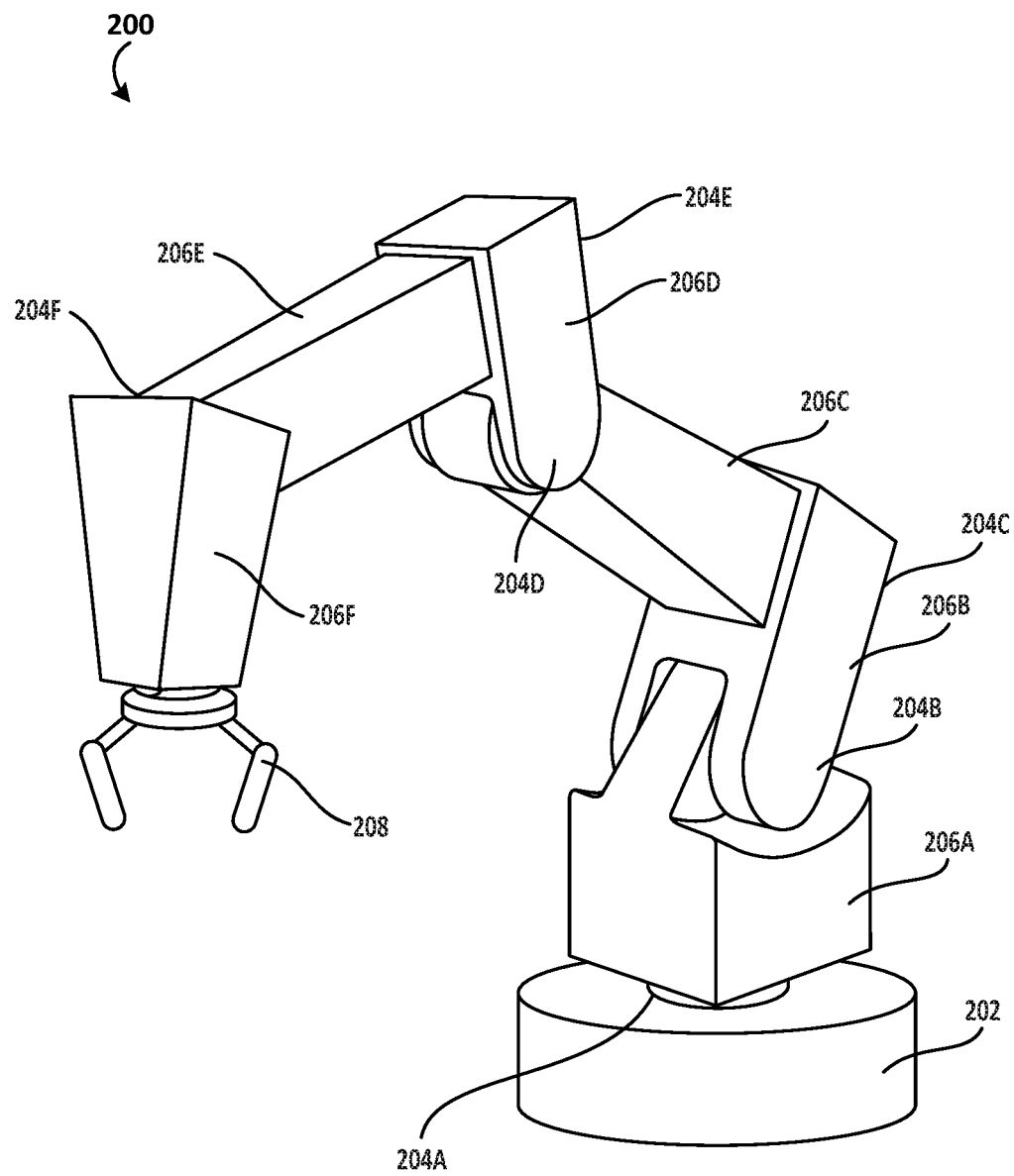
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
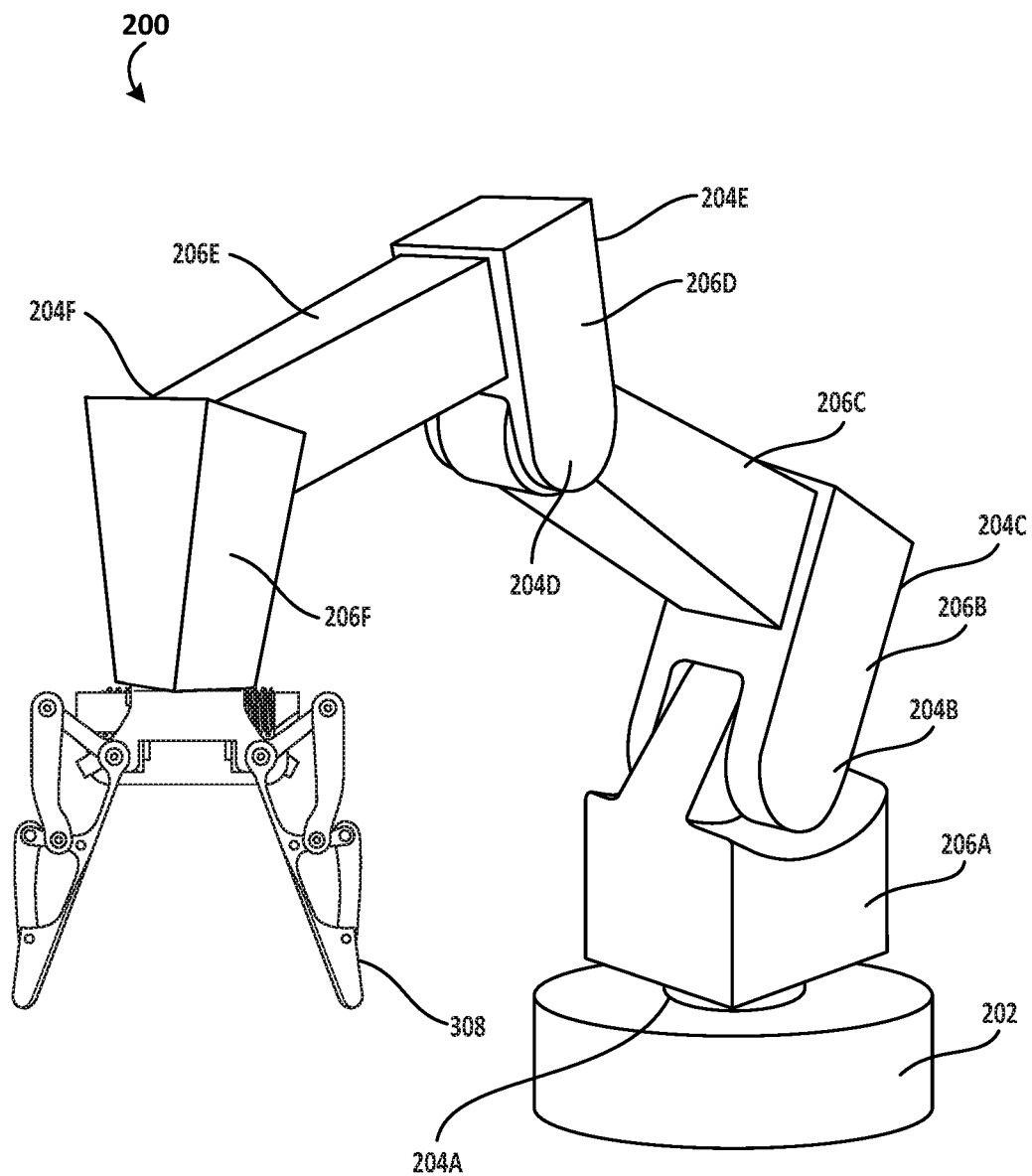
FIG. 3 illustrates the example robotic arm of FIG. 2 having a robotic gripping device, according to an example implementation.

FIG. 3 shows the example robotic arm 200 with a robotic gripping device 308. Robotic gripping device 308 may be similar or identical to robotic gripping device 500, 800, and 900 described in more detail below.

III. Example Robotic Gripping Device

Figure 4:
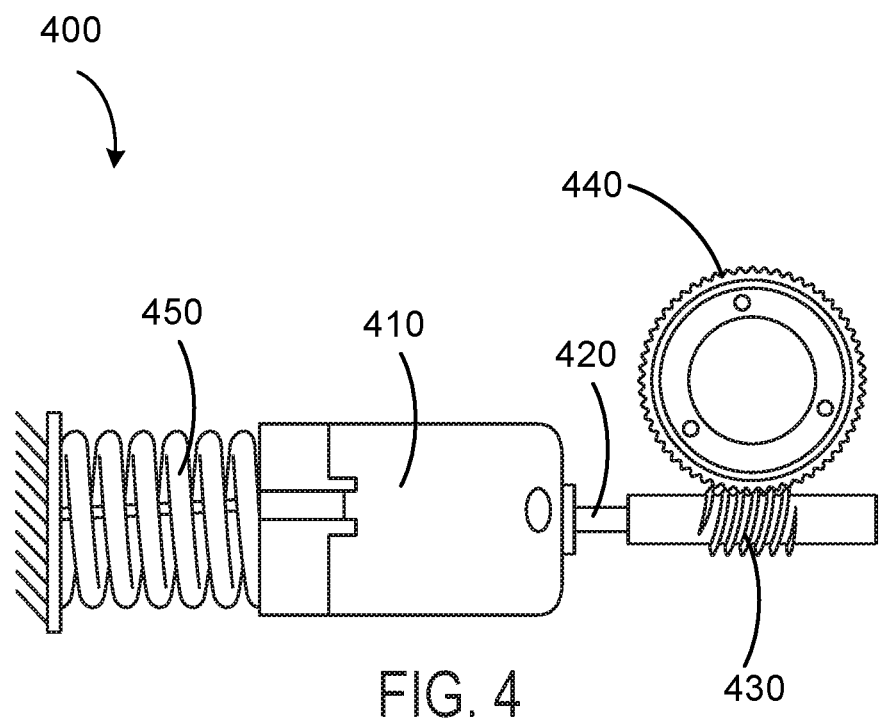
FIG. 4 illustrates an example mechanism for a robotic gripping device, according to an example implementation.

As noted above, the present disclosure includes implementations that relate to robotic gripping devices and/or end effectors. FIG. 4 illustrates a simplified example of one embodiment of the present disclosure. In FIG. 4, assembly 400 may include an actuator having a motor 410 and a shaft 420. Shaft 420 may be coupled to a worm 430. Worm 430 may be coupled to worm gear 440. And in turn, worm gear 440 may be coupled to a robotic finger (not shown) such that rotation of the worm gear 440 moves the robotic finger. In addition, assembly 400 may include a spring 450 that is coupled to motor 410 on a first end, and is fixed on a second end.

In one example, motor 410 may be actuated, and may cause shaft 420 to rotate in a clockwise direction. Shaft 420 may in turn cause worm 430 to rotate in a clockwise direction as well. And further, worm 430 may cause worm gear 440 to rotate, causing a robotic finger to move. Worm 430 may be able to drive worm gear 440 in either direction. However worm gear 440 may not be able to drive worm 430. As such, this orientation may not be back-drivable, and in the case where the motor is turned off or disengaged, shaft 420, worm 430 and worm gear 440 may remain stationary or relatively stationary. In this state, a torque may act upon worm gear 440 (i.e., a force acting upon a finger coupled to worm gear 440). That force may attempt to rotate the worm gear to back-drive the worm, however because the worm is not back-drivable, the entire subassembly will slide, compressing the spring. In this manner, forces or torques acting upon the finger coupled to the worm gear may pass through the assembly and cause the spring to compress or expand.

Figure 5:
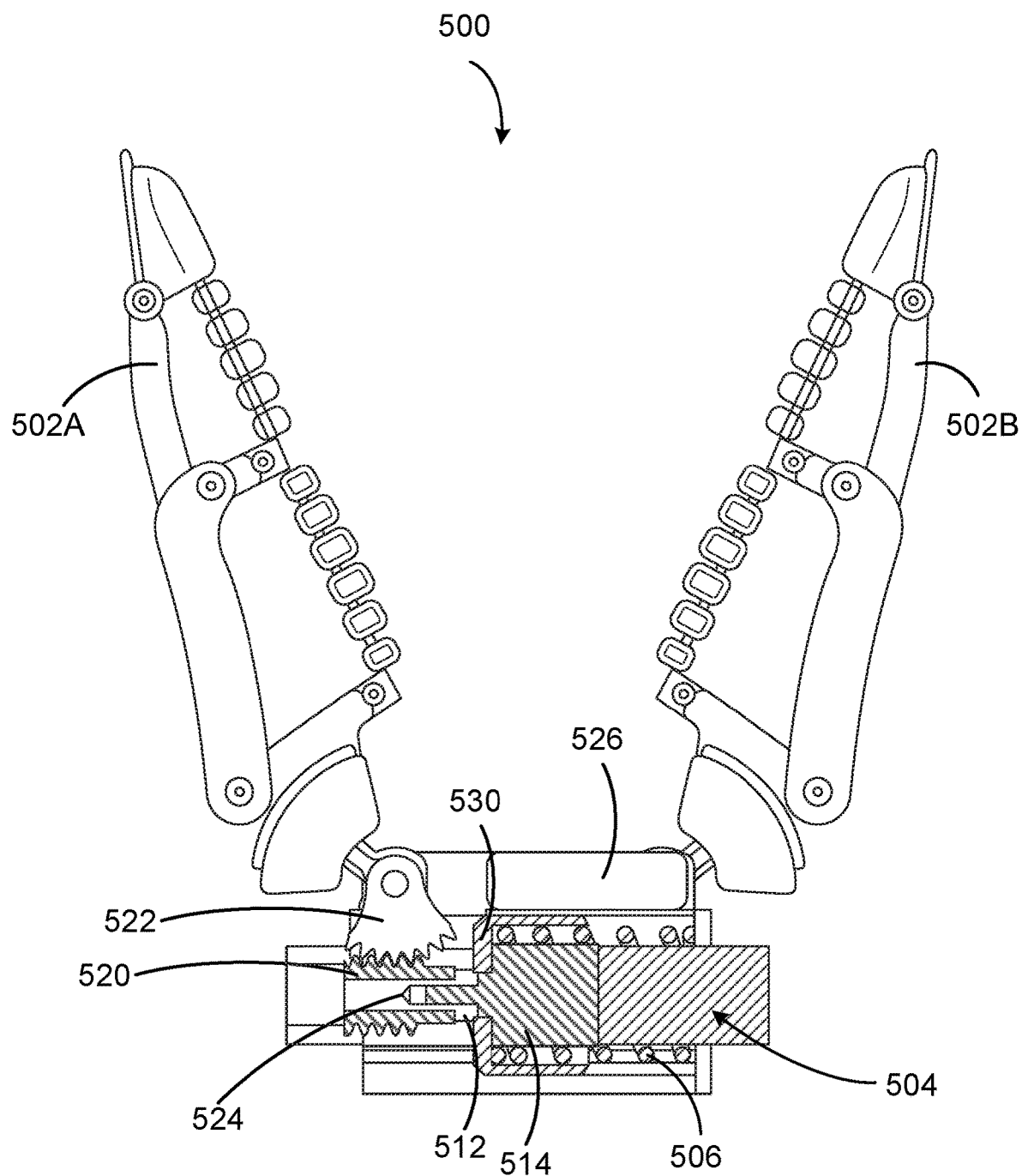
FIG. 5 illustrates the example robotic gripping device, according to an example implementation.

FIG. 5 illustrates example robotic gripping device 500, including components arranged to carry out the operation of the mechanism discussed with reference to FIG. 4. Robotic gripping device 500 may be implemented as a mechanical component of system 100 and/or robotic arm 200. Although the components illustrated in FIG. 5 are shown with a certain orientation and/or design, it should be understood that one or more components of robotic gripping device 500 may be removed, added, and/or modified while remaining within the scope of this disclosure. Also, the orientation and combination of components may be changed based on the desired implementation.

Robotic gripping device 500 may include one or more physical components, including one or more fingers 502A-B, actuators 504, and/or springs 506. In some examples, robotic gripping device 500 may include two opposable fingers, as shown in FIG. 5. In other examples, more or fewer fingers may be included. Where three or more fingers are included, the fingers may be arranged in two groups opposing each other, such that when they are actuated they close toward each other. Two fingers may be positioned opposite the third, such that when the fingers close they interlock. In other examples, the fingers may be positioned or spaced evenly around a palm or base section. Other arrangements are possible as well.

Each finger 502A-B may be configured to move in a gripping direction, to contact, grasp, hold, grip, or otherwise interact with an object. In this disclosure, movement of the finger(s) may refer to rotation about one or more axes. For example, the base of each finger may be rotatably coupled along a respective axis to one or more other components of the robotic gripping device, and movement of each finger may include rotation of the fingers about the respective axes. In some example the axis of rotation of a finger may be the axis about which a worm gear coupled to the finger rotates.

In other examples, movement of the fingers may include translational movement along an axis, such as movement in a clamping or sliding manner. The fingers may be coupled to one or more components of the robotic gripping device in a manner that allows them to maintain their orientation with respect to the gripping device (i.e., without rotating). For instance, a finger may move in a manner similar to how the components of a vice move, such that the plane created by the gripping surface of a finger remains fixed relative to the gripping device while movement of the fingers occurs. Or, the movement may be a combination of rotation and translation. Other types of movement are contemplated, with the above examples being included for description and to aid in understanding of the concepts involved herein.

The gripping surface of the fingers may be flexible and/or deformable, and may be a flexible plastic, rubber, or other material suitable for gripping an object. As a result, movement of a finger may include deformation of the gripping surface and/or structure of the finger. For example, the finger may deform, bend, curve, distort, warp, stretch, or otherwise alter its shape based on one or more factors, such as an impacting force or pressure. In an example embodiment, a two finger robotic gripping device such as the one shown in FIG. 5 may include an object placed at the midpoint of the fingers. When the fingers close on the object, the object may cause the tips of the fingers to bend or curl around the object. As described herein, movement of the fingers may include this deformation of the fingers.

In some examples, the fingers may be underactuated. Underactuated fingers do not include an actuator for each phalanx of the finger, but instead have fewer actuators and cannot control each phalanx independently. A phalanx is a section of a finger. As an example, a typical human index finger includes three phalanges. One benefit of underactuated fingers is that they can require less complex control systems and can be simpler to manufacture than fully actuated fingers.

For purposes of explanation, the components of FIG. 5 will be described with respect to a single finger. However, multiple fingers, actuators, springs, and gears may be included in a robotic gripping device according to this disclosure.

In FIG. 5, finger 502A may be coupled to a worm gear 522. In some examples, worm gear 522 may be connected directly to a bottom end of finger 502A. In other examples, worm gear 522 may be coupled to finger 502A through one or more other gears and/or components, and may be coupled to a section of the finger other than the bottom end. As used herein, a first component "coupled" to a second component means that the two components may be directly connected to each other, or may have one or more components, gears, shafts, or connecting elements placed between them. As shown in FIG. 5, worm gear 522 is directly connected to finger 502A.

Worm gear 522 may be a circular worm gear or worm wheel, having teeth facing outward surrounding an inner wheel. In some examples, the shape of worm gear 522 may be a partial circle, such as the worm gear shown in FIG. 5. Further, the shape of worm gear 522 may be either symmetric or asymmetric, full or partial, and may be a circle or any other shape. Worm gear 522 may be coupled to finger 502A such that rotation of worm gear 522 causes finger 502A to move and/or rotate. And further, worm gear 522 may be coupled such that rotation and/or movement of finger 502A causes the worm gear to rotate (i.e., worm gear 522 and finger 502A can drive each other). In some examples, the teeth of worm gear 522 may be curved and/or angled to provide a smoother coupling to worm 520. This may result in smoother operation of the robotic gripping device.

Robotic gripping device 500 may also include an actuator 504. Actuator 504 may include a motor 514 and a shaft 512. When the actuator is turned on, engaged, or otherwise activated, motor 514 may rotate shaft 512 in a clockwise or counterclockwise direction. Shaft 512 may be coupled to worm 520, and may be configured to cause worm 520 to rotate. Worm 520 may be a cylindrical gear, with teeth similar to the threads on a screw or bolt. Worm 520 may also be called a 'worm screw.' Worm 520 may be coupled to worm gear 522 such that the axis of rotation of worm 520 is perpendicular to the axis of rotation of worm gear 522.

Worm 520 and worm gear 522 may have a high reduction ratio. Where there is a high reduction ratio, one full rotation of worm 520 may correspond to $\frac{1}{32}$ of a full rotation (or some other small amount) of worm gear 522. The reduction ratio may depend on the number and spacing of the teeth of worm gear 522 and worm 520. A characteristic of the high reduction ratio is that the worm is not back-drivable. As such, a force rotating worm 520 may cause worm gear 522 to responsively rotate, but a force rotating the worm gear 522 may not cause the worm 520 to responsively rotate.

In some examples, actuator 504 may be mounted on a carriage 530 such that the actuator 504 and carriage 530 are configured to slide together along an axis. One or more components of actuator 504 may be glued, screwed, or otherwise affixed to carriage 530. Carriage 530 in turn may be coupled to a base section via a sliding coupling or other low friction coupling. As such, carriage 530 may be free to slide along one axis. Carriage 530 may be any component that allows actuator 504 to slide along the axis. As such, carriage 530 may be any shape or dimension that couples to actuator 504 to allow the actuator to slide along the axis, and may be a plastic, metal, composite, or other material.

Robotic gripping device 500 may also include a spring 506. Spring 506 may have two ends, with a first end coupled to actuator 504 and a second end fixed. In FIG. 5, the second end of spring 506 is fixed to the base of robotic gripping device 500. Spring 506 may be fixed to another component of robotic gripping device 500 as well. In some example, spring 506 may be configured such that the first end moves when carriage 530 and actuator 504 slide. When actuator 504 and carriage 530 are in a first position, spring 506 may be at equilibrium. Equilibrium means that the forces acting on the spring are balanced, such that an added force is required to compress or expand the spring. Then when actuator 504 slides to a second position (due to one or more forces or torques acting on the robotic gripping device), spring 506 may be compressed or expanded such that spring 506 is no longer at equilibrium. In this state, spring 506 may impart a responsive force on actuator 504 in an attempt to return to the first position at which the spring is at equilibrium.

Figure 6:
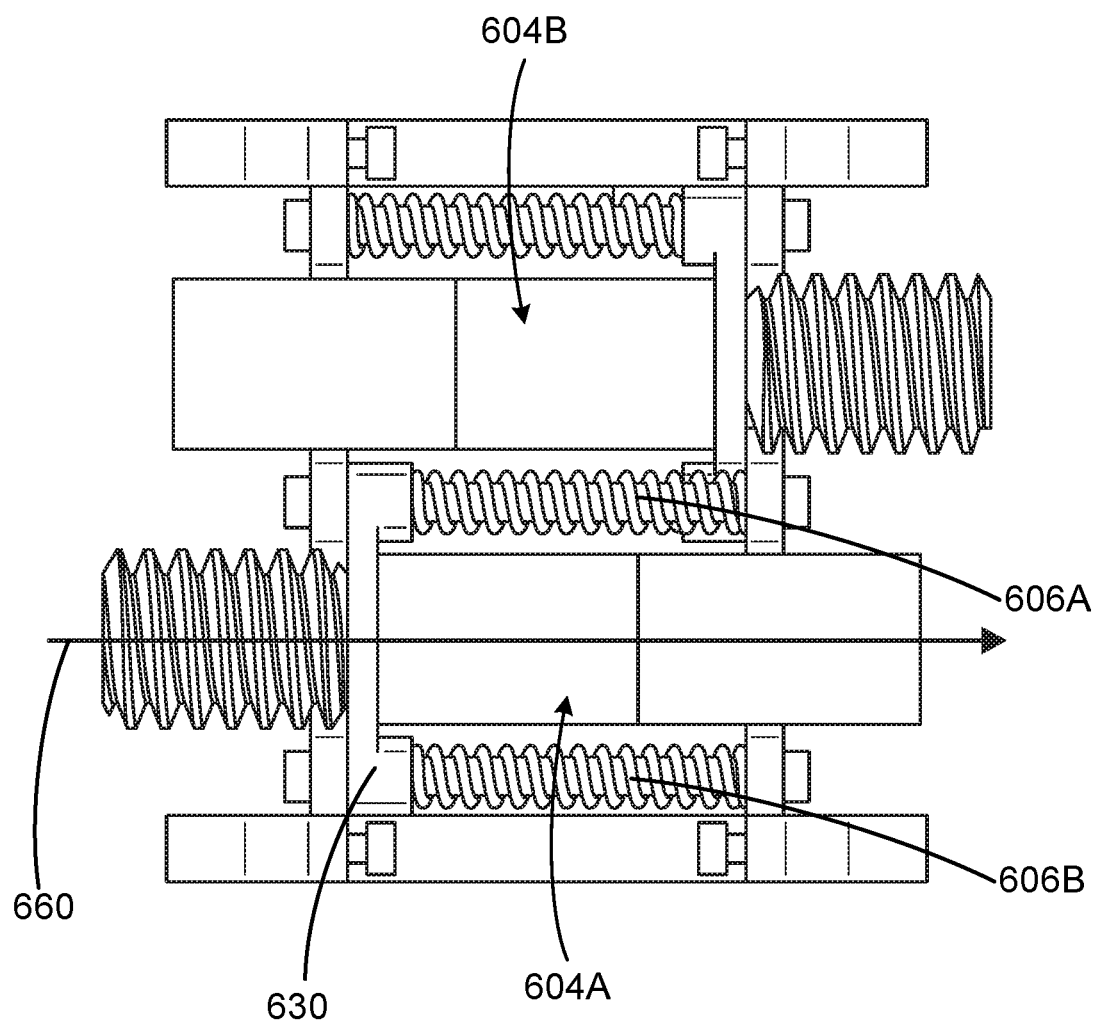
FIG. 6 illustrates an example robotic gripping device mechanism, according to an example implementation.

In some examples, the spring may surround the actuator, such as spring 506 shown in FIG. 5. More or less of actuator 504 may be surrounded by spring 506 than shown in FIG. 5. Arranging spring 506 around actuator 504 results in a more compact design, allowing a robotic gripping device to be smaller and thus appropriate for more uses and applications. In other examples, two or more springs may be used, and the spring(s) may be positioned to the side or otherwise not surrounding the actuator. For instance, FIG. 6 shows a configuration of two actuators 604A-B in which each actuator is coupled to two springs positioned on either side of each actuator. When actuator 604A and carriage 630 slide along axis 660, corresponding springs 606A-B compress or expand.

Spring 506 may have one or more characteristics, such as size, firmness, spring constant, and/or material. Each of these characteristics may be altered based on the particular application of the robotic gripping device. For example, a spring with a higher spring constant may require more force to compress or expand, which may be used to determine the appropriate spring to use for a particular application.

In some examples, the robotic gripping device may also include one or more encoders, sensors, or detectors configured to detect the rotation, position, movement, and/or forces acting on one or more parts of the robotic gripping device. For example, robotic gripping device 500 may include actuator encoder 524, which may be positioned on or coupled to the base of robotic gripping device 500. Actuator encoder 524 may be configured to detect the rotation of shaft 512, and may provide information about the extent or amount of rotation to a control system. Actuator encoder 524 may also be positioned on the shaft 512, or may be positioned on one or more other components of robotic gripping device 500. In some examples, actuator encoder 524 may detect the rotation of the actuator with respect to motor 514, the base of the robotic gripping device, and/or one or more other components. As such, both relative and absolute amounts of rotation of shaft 512 may be detected. Further, robotic gripping device 500 may include one or more finger encoders configured to detect the rotation and/or movement of one or more fingers.

Actuator encoder 524 and/or the one or more finger encoders may be rotary encoders. In some cases, the encoders may be mechanical, optical, magnetic, capacitive, or another type of encoder. In addition, the encoders may be absolute or may be incremental.

In some examples, robotic gripping device 500 may include one or more linear encoders or potentiometers 526. Potentiometer 526 may be configured to detect a position of carriage 530 relative to the base of the robotic gripping device, and provide an output that may be received by a control system. The potentiometer may also detect a relative movement of carriage 530. In some examples, potentiometer may detect the position of carriage 530 in a first position in which spring 506 is at equilibrium, and detect the position of carriage 530 when the spring is compressed or expanded. The potentiometer may determine the difference between the first and second position and provide this information to the control system. Various types of linear encoders may be used, such as optical, magnetic, capacitive, or inductive encoders.

Robotic gripping device 500 may also include a control system such as control system 118 in FIG. 1, which may control one or more aspects of robotic gripping device 500. The control system may include one or more processors, and may also include a non-transitory computer-readable memory, which may have stored thereon instructions executable by the one or more processors to carry out one or more actions described in this disclosure.

In some examples, the control system may determine an amount of torque acting on finger 502A by receiving information from potentiometer 526. The information provided by potentiometer 526 may include a distance the actuator has translated between a first position (equilibrium) and a second position (non-equilibrium). The control system may then determine the amount of torque based on the difference between the first and second positions and a characteristic of the spring, such as a spring constant.

In some examples, the control system may also be configured to identify an object for the robotic gripping device to grasp, and activate one or more actuators to move one or more fingers of the robotic gripping device. These actions are described in more detail below with respect to FIG. 7.

IV. Example Operations

Figure 7:
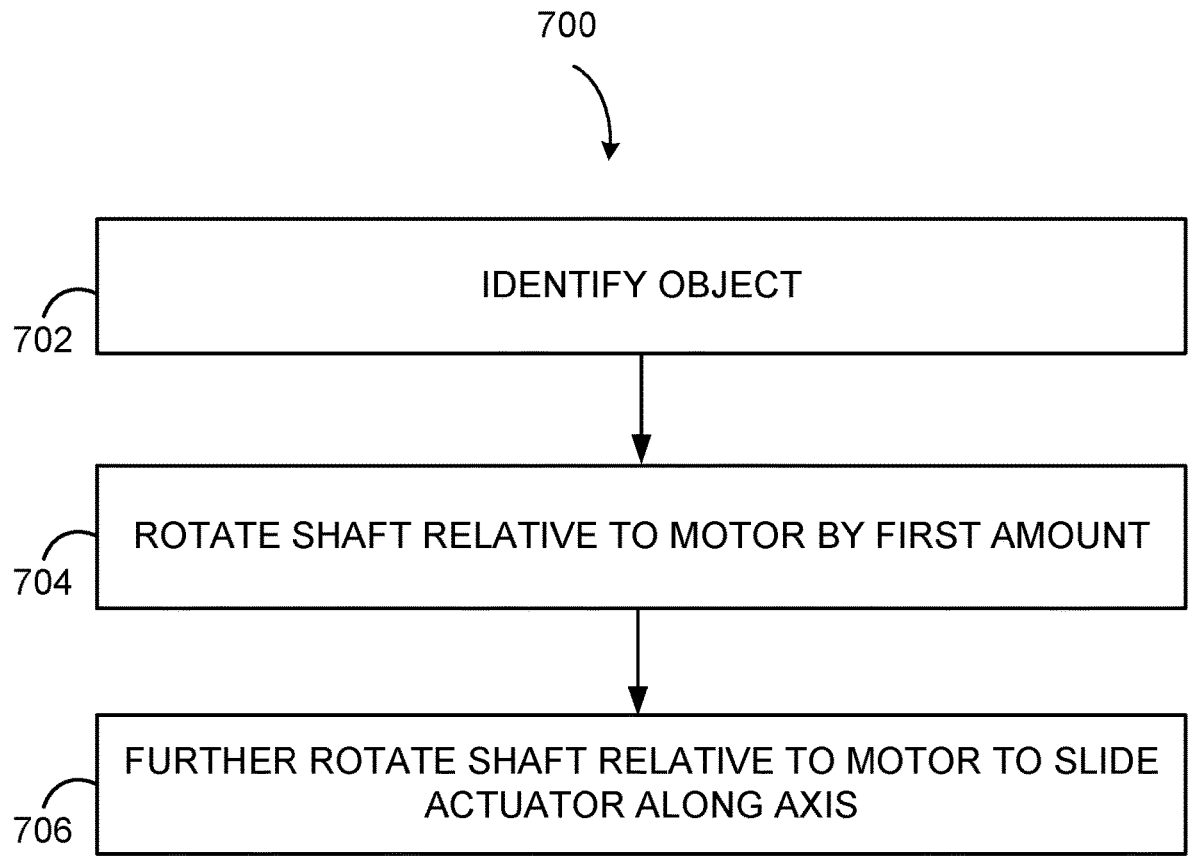
FIG. 7 illustrates an example method of operating a robotic gripping device, according to an example implementation.

FIG. 7 illustrates a flowchart of an example method 700 of operating a robotic gripping device of the present disclosure. This example applies to a robotic gripping device such as robotic gripping device 500, but may be applied to other robotic gripping devices having different arrangements and/or different components than those described herein. Further, method 700 may be carried out by one or more control systems of the robotic system 100 and/or robotic arm 200. Method 700 is described as being carried out for a single robotic finger, but some or all of the blocks of method 700 may be carried out for two or more fingers, actuators, and springs.

At block 702, method 700 may include identifying an object for a robotic gripping device to grasp, grip, pinch, grab, or hold. In some examples, identifying the object may include determining an object based on its shape, orientation, profile, size, or another characteristic. In other examples, the object may be identified by a remote operator and/or computing system coupled to the robotic gripping device. The determination may be made based on received sensor data from one or more sensors, such as a visual sensor, touch sensor, pressure sensor, or other sensor, for example. Block 702 may also include a robotic device positioning the robotic gripping device such that the object is between the fingers of the robotic gripping device.

In some examples the robotic gripping device may include one or more fingers that are configured to move toward each other to grasp the object. Each finger may be coupled to a respective worm gear at a base end of the fingers. The robotic gripping device may also include an actuator having a motor and a shaft, wherein the shaft is configured to rotate a worm coupled to the worm gear of a finger. The actuator may be mounted on a carriage such that the actuator is configured to slide along an axis. The robotic gripping device may also include a spring having a first end and a second end, wherein the first end is coupled to the motor of the actuator and the second end is fixed, such that the actuator is held in a first position along the axis when the spring is at equilibrium.

Figure 8A:
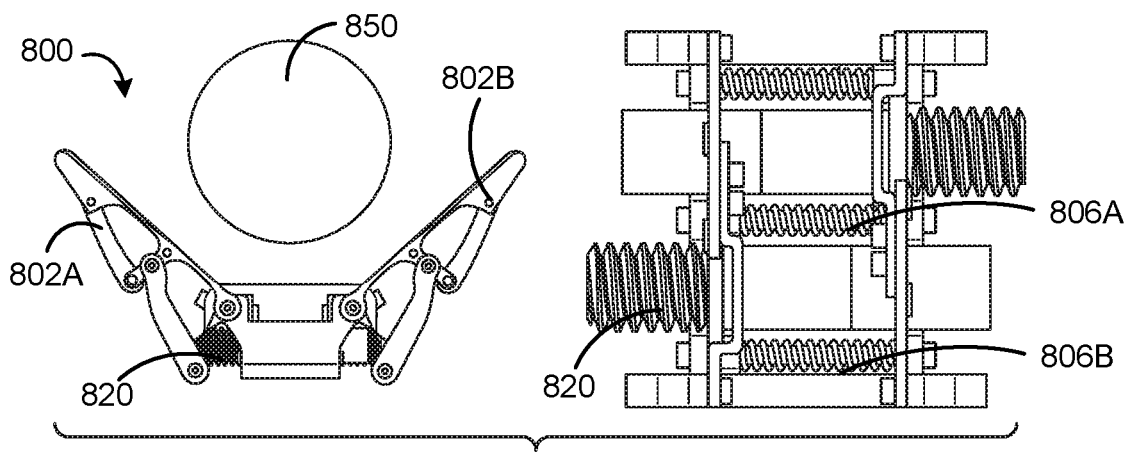
FIGS. 8A, 8B, and 8C illustrate example states of a robotic gripping device, according to example implementations.
Figure 8B:
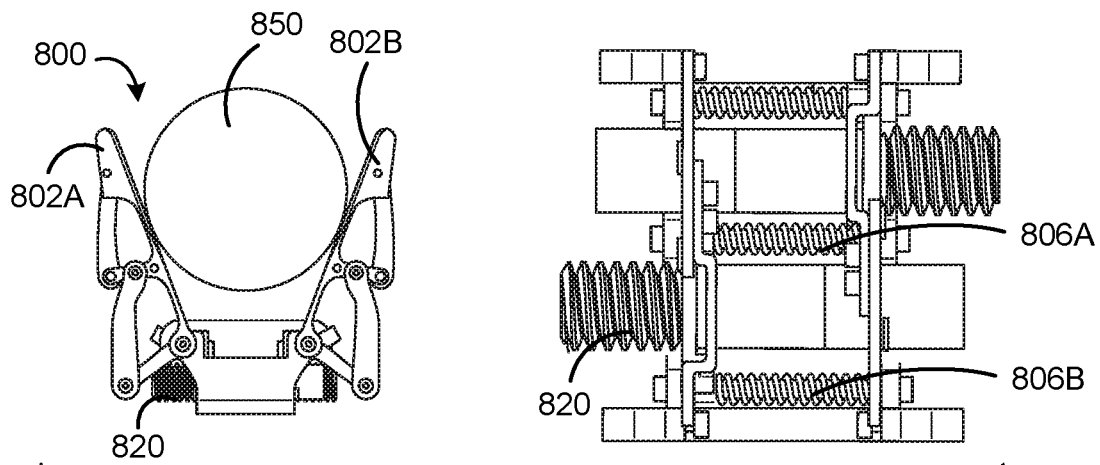

At block 704, method 700 may include rotating the shaft of the actuator relative to the motor by a first amount. Prior to rotation of the shaft relative to the motor, the shaft and motor may be in a first position, in which the finger of the robotic gripping device is in an open position. This position can be seen in FIG. 8A, in which fingers 802A-B of robotic gripping device 800 are in an open position. Also in FIG. 8A, object 850 is positioned between fingers 802A-B. At block 704, rotation of the shaft relative to the motor by the first amount may cause the worm to rotate, which in turn may cause the worm gear to rotate, which in turn may cause the finger to move toward the identified object, for instance by rotating to close on the identified object. This position can be seen in FIG. 8B. It should be noted that springs 806A-B have not been compressed in FIG. 8B. The first amount of rotation of the shaft relative to the motor may be an amount such that the finger closes and makes contact with the identified object.

In some examples, the first amount of rotation of the shaft relative to the motor may be such that the finger continues to move or rotate until it is prevented from further rotation by the identified object, or an opposing finger, or a hardstop on the gripper. The finger may continue to close on the object, and may compress the object if it is compressible, such as a sponge, for example.

Figure 8C:
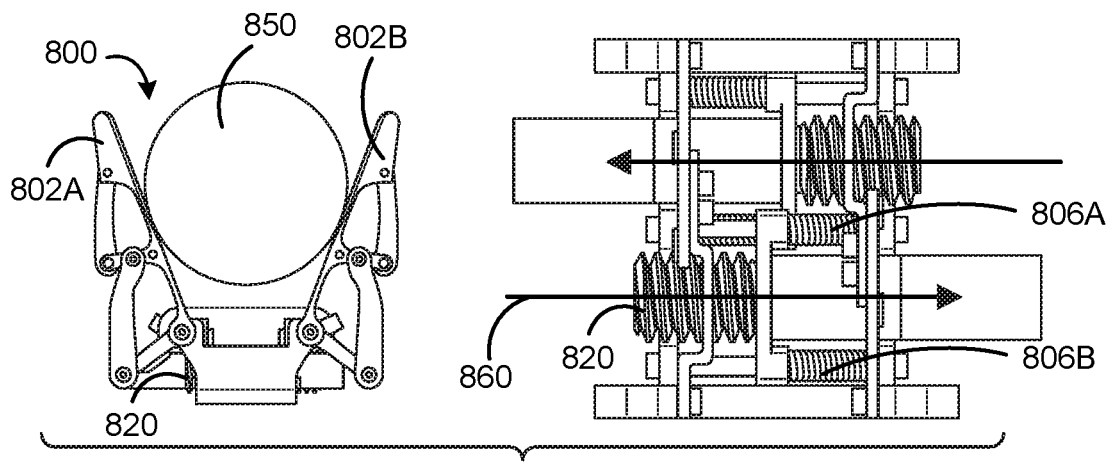

Once the finger is prevented from further movement by the identified object, the worm gear is also prevented from rotating. At this point, block 706 of method 700 may include further rotating the shaft relative to the motor. But instead of this further rotation causing the finger to further close, the additional rotation may cause the worm to rotate against the stationary worm gear, which in turn may slide the actuator along the axis. FIG. 8C illustrates this position of the robotic gripping device, with the actuator having slid along axis 860.

As shown in FIG. 8C, when finger 802A is prevented from further movement, the worm gear corresponding to finger 802A is prevented from rotating further as well. Further when the shaft continues to rotate worm 820, the additional rotation of worm 820 causes the worm 820 to slide backward, in turn causing the actuator to slide along the axis to the second position. At this second position, springs 806A-B are compressed.

In some examples, the robotic gripping device carrying out method 700 may include one or more encoders, such as the actuator encoder and/or potentiometer described above with respect to FIG. 5. In those examples, method 700 may further include determining an amount of torque applied to the finger of the robotic gripping device. The torque may be determined in the gripping direction, and may be the torque applied to the finger by the actuator when the finger is prevented from further movement by the object or another finger, as described above.

In order to determine the amount of torque applied to the fingers, the control system may receive information from the potentiometer indicating the position of the actuator. This value, in combination with the characteristics of the spring (e.g., size, firmness, spring constant, and/or material) can be used to determine the torques acting on the fingers and other components of the robotic gripping device.

V. Example Robotic Device

An example embodiment of the present disclosure may be a robotic device including one or more components. The robotic device may include a robotic gripping device, such as those described above. In addition, the example robotic device may include a control system. The control system may include one or more processors, a non-transitory computer-readable memory, and program instructions stored on the non-transitory computer-readable memory executable by the one or more processors to carry out one or more actions. The one or more actions may include (i) identifying an object for the robotic gripping device to grasp, (ii) rotating the shaft relative to the motor by a first amount, thereby rotating the worm and worm gear to move the finger toward the identified object, and (iii) when the finger is in contact with the object and the finger is prevented from further movement, further rotating the shaft relative to the motor to slide the actuator along the axis to a second position at which the spring is no longer at equilibrium. In some examples, the robotic device carrying out the instructions may be similar or identical to performing the method 700.

VI. Example Variations

Some of the examples described above included a robotic gripping device having a single finger, worm gear, worm, actuator, and spring. Other example embodiments may include two or more fingers, each having a worm gear. Each finger may also have an associated worm, actuator, and spring, such that each finger of the robotic gripping device may perform the operations described herein.

Figure 9A:
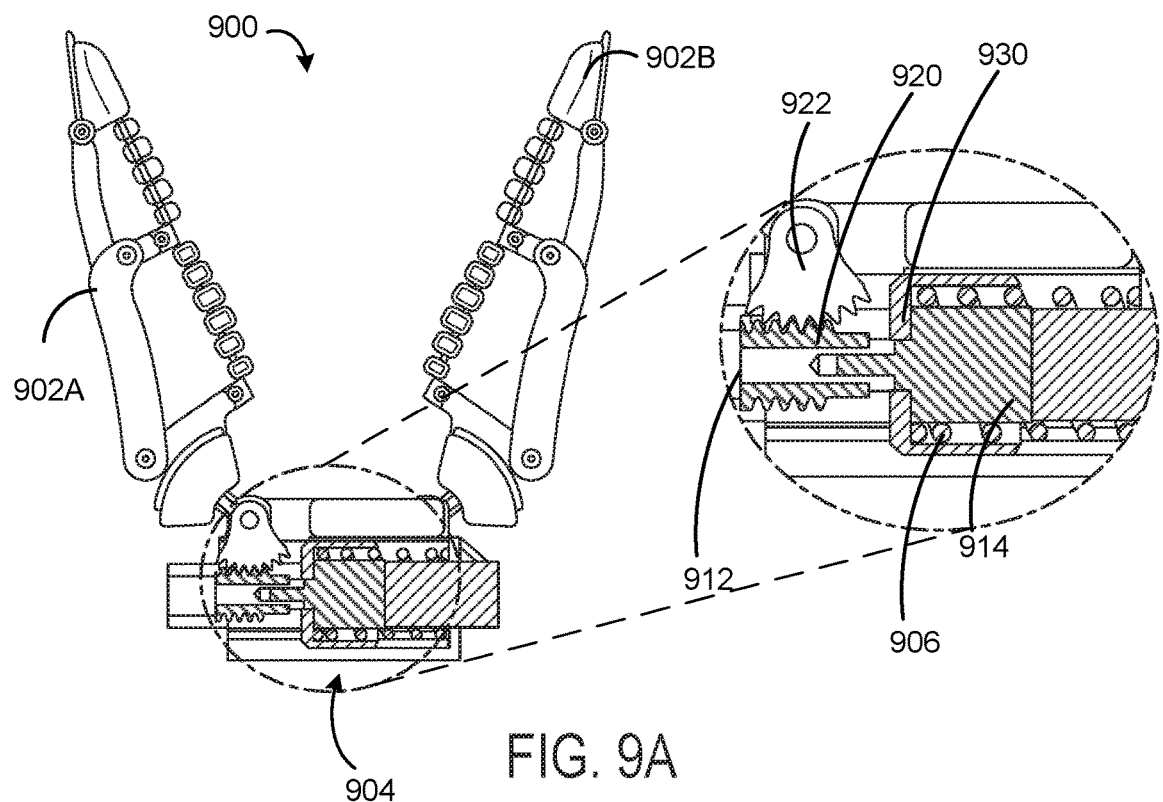
FIGS. 9A and 9B illustrate two additional example states of a robotic gripping device, according to example implementations.
Figure 9B:
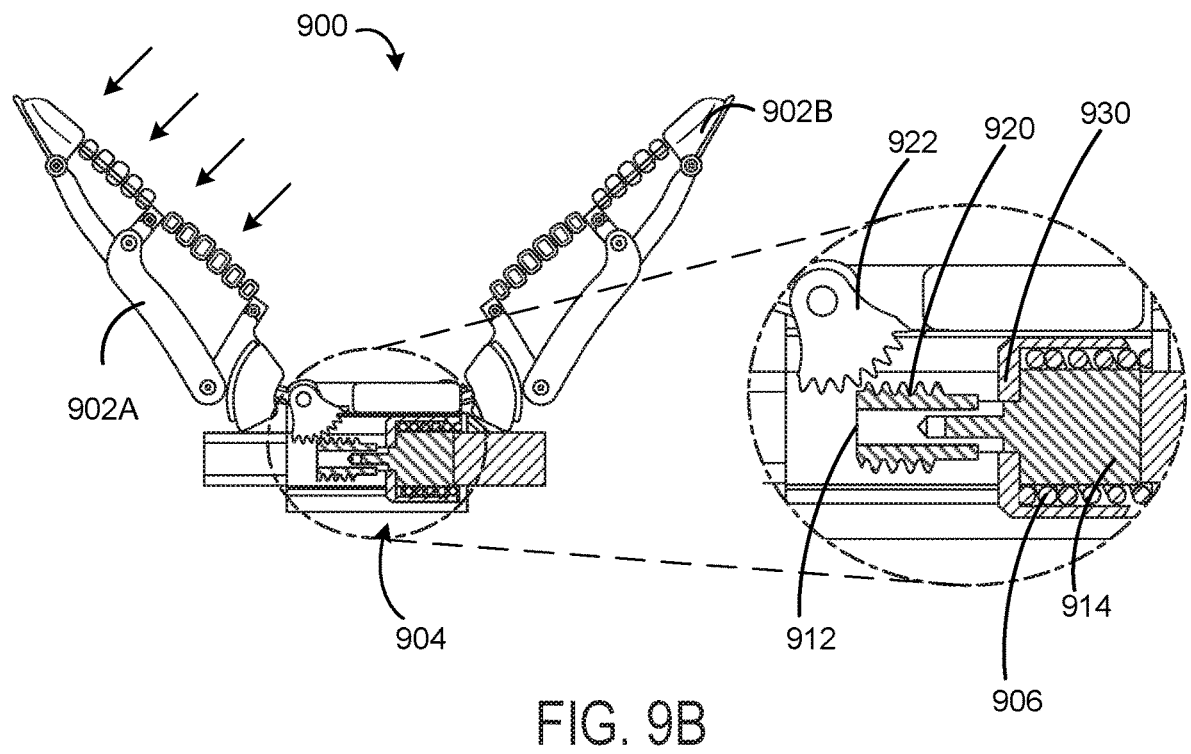

FIGS. 9A and 9B illustrate an example robotic gripping device 900 in two states according to an embodiment of the present disclosure. FIGS. 9A and 9B illustrate what may occur when a torque greater or larger than a threshold torque acts upon a finger.

FIG. 9A illustrates robotic gripping device 900 in a first state, in which fingers 902A-B do not have any force or torque acting on them. Worm gear 922 is coupled to worm 920, and spring 906 is in a state of equilibrium.

FIG. 9B illustrates robotic gripping device 900 in a second state, in which a force or torque has been put on finger 902A causing finger 902A to rotate to a more open position. The rotation of finger 902A has caused worm gear 922 to rotate, which in turn caused worm 920 to slide (along with actuator 904 and carriage 930). Motor 914 has not been activated, and as such shaft 912 and worm 920 have not rotated.

FIG. 9B shows that when a torque greater than a threshold torque acts on the finger, the worm gear 922 may disengage from the worm 920. As shown in FIG. 9B, the last tooth of the worm 920 is beyond the teeth of worm gear 922. The decoupling of worm gear 922 from worm 920 may allow the finger to move out of the way in the event an impacting object hits the finger, without damaging the gears and/or components of robotic gripping device 900.

The threshold torque may correspond to the characteristics of the spring and/or one or more components of the robotic gripping device. For instance, where the spring has a high spring constant and requires a large force to compress, the threshold torque acting on the finger required to disengage the worm gear from the worm may be high as well. Alternatively, where a spring is used having a low spring constant, there may be a relatively low threshold force required to disengage the worm gear from the worm.

VII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robotic gripping device comprising:
a finger having a worm gear coupled to a base end of the finger;
an actuator having a motor and a shaft, wherein the shaft is configured to rotate a worm coupled to the worm gear, and wherein the actuator is mounted on a carriage such that the actuator is configured to slide along an axis; and
a spring surrounding at least the motor of the actuator and having a first end and a second end, wherein the first end is coupled to the motor of the actuator and the second end is fixed, such that the actuator is held in a first position along the axis when the spring is at equilibrium;
wherein the actuator is configured to:
rotate the shaft relative to the motor by a first amount, thereby rotating the worm and the worm gear to move the finger toward an object; and
when the finger is in contact with the object and the finger is prevented from further movement, further rotate the shaft relative to the motor to slide the actuator along the axis to a second position at which the spring is no longer at equilibrium.

2. The robotic gripping device of claim 1, further comprising:
a linear encoder configured to determine a difference between the first position and the second position; and
a control system, wherein the control system is configured to determine an amount of torque applied to the finger based on the difference between the first position and the second position.

3. The robotic gripping device of claim 1, wherein the spring surrounding at least the motor of the actuator comprises at least the motor of the actuator being disposed within a coil of the spring.

4. The robotic gripping device of claim 1, wherein the finger comprises a first finger, and wherein the robotic gripping device further comprises a second finger having a respective worm gear and associated worm, actuator, and spring.

5. The robotic gripping device of claim 1, wherein a shape of the worm gear is a partial circle, and wherein the actuator is configured to disengage the worm from the worm gear when a torque greater than a threshold torque is applied to the finger.

6. The robotic gripping device of claim 1, wherein the finger is an underactuated finger.

7. The robotic gripping device of claim 1, wherein the finger is configured to move translationally.

8. The robotic gripping device of claim 1, wherein the finger is configured to move rotationally about an axis defined by the worm gear.

9. A robotic device comprising:
a robotic gripping device, wherein the robotic gripping device comprises:
a finger having a worm gear coupled to a base end of the finger;
an actuator having a motor and a shaft, wherein the shaft is configured to rotate a worm coupled to the worm gear, and wherein the actuator is mounted on a carriage such that the actuator is configured to slide along an axis; and
a spring surrounding at least the motor of the actuator and having a first end and a second end, wherein the first end is coupled to the motor of the actuator and the second end is fixed, such that the actuator is held in a first position along the axis when the spring is at equilibrium; and
a control system configured to control the robotic gripping device, wherein the control system comprises:
one or more processors;
a non-transitory computer-readable memory; and program instructions stored on the non-transitory computer-readable memory and executable by the one or more processors to:
  cause the actuator to rotate the shaft relative to the motor by a first amount, thereby rotating the worm and the worm gear to move the finger toward an object; and
  when the finger is in contact with the object and the finger is prevented from further movement, cause the actuator to further rotate the shaft relative to the motor to slide the actuator along the axis to a second position at which the spring is no longer at equilibrium.

10. The robotic device of claim 9, further comprising:
a linear encoder configured to determine a difference between the first position and the second position, wherein the program instructions are further executable to determine an amount of torque applied to the finger based on the difference between the first position and the second position.

11. The robotic device of claim 9, wherein the spring surrounding at least the motor of the actuator comprises at least the motor of the actuator being disposed within a coil of the spring.

12. The robotic device of claim 9, wherein the finger comprises a first finger, and wherein the robotic gripping device further comprises a second finger having a respective worm gear and associated worm, actuator, and spring.

13. The robotic device of claim 9, wherein a shape of the worm gear is a partial circle, and wherein the actuator is configured to disengage the worm from the worm gear when a torque greater than a threshold torque is applied to the finger.

14. The robotic device of claim 9, wherein the finger is configured to move translationally.

15. The robotic device of claim 9, wherein the finger is configured to move rotationally about an axis defined by the worm gear.

16. A method comprising:
identifying an object for a robotic gripping device to grasp, wherein the robotic gripping device comprises a finger, an actuator, and a spring, wherein:
  the finger has a worm gear coupled to a base end of the finger,
  the actuator has a motor and a shaft, wherein the shaft rotates a worm coupled to the worm gear, and wherein the actuator is mounted on a carriage such that the actuator is configured to slide along an axis; and
  the spring surrounds at least the motor of the actuator and has a first end and a second end, where the first end is coupled to the motor of the actuator and the second end is fixed, such that the actuator is held in a first position along the axis when the spring is at equilibrium;
rotating the shaft relative to the motor by a first amount, thereby rotating the worm and the worm gear to move the finger toward an object; and
when the finger is in contact with the object and the finger is prevented from further movement, further rotating the shaft relative to the motor to slide the actuator along the axis to a second position at which the spring is no longer at equilibrium.

17. The method of claim 16, wherein the robotic gripping device further comprises a linear encoder configured to determine a difference between the first position and the second position, wherein the method further comprises:
  determining an amount of torque applied to the finger based on the difference between the first position and the second position.

18. The method of claim 16, wherein the spring surrounding at least the motor of the actuator comprises at least the motor of the actuator being disposed within a coil of the spring.

19. The method of claim 16, wherein the finger comprises a first finger having a respective first shaft, motor, actuator, spring, worm gear, and worm, and the robotic gripping device further comprises a second finger having a respective second shaft, motor, actuator, spring, worm gear, and worm, wherein the method further comprises:
  for each of the first and second respective shafts, motors, actuators, springs, worm gears, and worms:
    rotating the shafts relative to the motors by first amounts, thereby rotating the worms and the worm gears to move the fingers toward an object; and
    when the fingers are in contact with the object and the fingers are prevented from further movement, further rotating the shafts relative to the motors to slide the actuators along respective axes to second positions at which the springs are no longer at equilibrium.

20. The method of claim 16, wherein a shape of the worm gear is a partial circle, and wherein the method further comprises:
  disengaging the worm from the worm gear when a torque greater than a threshold torque is applied to the finger.

* * * * *